United States Patent
Huber et al.

(10) Patent No.: US 9,540,106 B2
(45) Date of Patent: Jan. 10, 2017

(54) LOCKING ELEMENT

(75) Inventors: Thomas Huber, Schliersee (DE); Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 910 days.

(21) Appl. No.: 13/379,985

(22) PCT Filed: Jun. 22, 2009

(86) PCT No.: PCT/EP2009/004484
§ 371 (c)(1),
(2), (4) Date: Jan. 31, 2012

(87) PCT Pub. No.: WO2010/149179
PCT Pub. Date: Dec. 29, 2010

(65) Prior Publication Data
US 2012/0132744 A1     May 31, 2012

(51) Int. Cl.
*B64C 1/20*     (2006.01)
*B64D 9/00*     (2006.01)

(52) U.S. Cl.
CPC .............. *B64D 9/003* (2013.01); *Y02T 50/46* (2013.01); *Y10T 29/49826* (2015.01)

(58) Field of Classification Search
CPC ..... B64D 9/003; Y10T 29/49826; Y02T 50/46
USPC ..... 244/137.4, 118.1, 118.2; 410/46, 52, 68, 410/75, 77, 78, 79, 80, 81, 92, 94, 95, 110, 115, 410/69, 70, 85, 84, 86, 87, 104
See application file for complete search history.

(56) References Cited

U.S. PATENT DOCUMENTS

| | | | | |
|---|---|---|---|---|
| 3,377,040 | A * | 4/1968 | Hansen | 410/79 |
| 3,778,012 | A * | 12/1973 | Fernandez | B64D 9/003 193/40 |
| 4,089,275 | A * | 5/1978 | Pelletier | B64D 9/003 410/79 |
| 4,415,298 | A * | 11/1983 | Voigt | 410/69 |
| 4,457,649 | A * | 7/1984 | Vogg et al. | 410/46 |
| 5,131,606 | A * | 7/1992 | Nordstrom | 244/118.1 |
| 5,871,317 | A * | 2/1999 | Huber et al. | 410/79 |

(Continued)

FOREIGN PATENT DOCUMENTS

| | | | | |
|---|---|---|---|---|
| DE | 41 02 274 | 12/2007 | | |
| DE | 102006060785 | * 3/2008 | | B64D 9/00 |

(Continued)

OTHER PUBLICATIONS

English translation of Written Opinion of the International Searching Authority in PCT application PCT/EP2009/004484, Jan. 4, 2012.

(Continued)

*Primary Examiner* — Brian M O'Hara
*Assistant Examiner* — Assres H Woldemaryam
(74) *Attorney, Agent, or Firm* — Barnes & Thornburg LLP

(57) ABSTRACT

A lock is proposed for securing containers or similar freight on a cargo bay floor of an aircraft in a vertical direction perpendicular to the cargo bay floor and in a transverse direction perpendicular to a longitudinal direction of the aircraft. The locking element comprises at least one lock attached to a frame for securing containers or similar freight and with a claw in the transverse direction of the aircraft to surround and hold a part section of the container. At least one lock is arranged mobile and fixable in a guide of the frame in order to adapt the spacing of the locks to containers of different sizes.

16 Claims, 7 Drawing Sheets

(56) References Cited

U.S. PATENT DOCUMENTS

| | | | |
|---|---|---|---|
| 7,731,460 B2* | 6/2010 | Brown et al. | 410/77 |
| 8,496,418 B2* | 7/2013 | Huber et al. | 410/69 |
| 8,925,861 B2* | 1/2015 | Huber et al. | 244/118.1 |
| 2003/0095846 A1* | 5/2003 | Breckel | 410/104 |
| 2007/0025832 A1* | 2/2007 | Rawdon et al. | 414/401 |
| 2007/0095978 A1* | 5/2007 | Oetken et al. | 244/118.1 |
| 2008/0304931 A1 | 12/2008 | Schulze | |
| 2010/0264267 A1* | 10/2010 | Barauke et al. | 244/118.1 |
| 2010/0316460 A1* | 12/2010 | Schulze | B64D 9/003 410/104 |

FOREIGN PATENT DOCUMENTS

| | | |
|---|---|---|
| EP | 0 753 457 | 1/1997 |
| EP | 1 935 782 | 6/2008 |
| FR | 2 117 983 | 7/1972 |
| FR | 2 500 805 | 9/1982 |

OTHER PUBLICATIONS

International Search Report for International Application No. PCT/EP2009/004484 dated Mar. 5, 2010.

\* cited by examiner

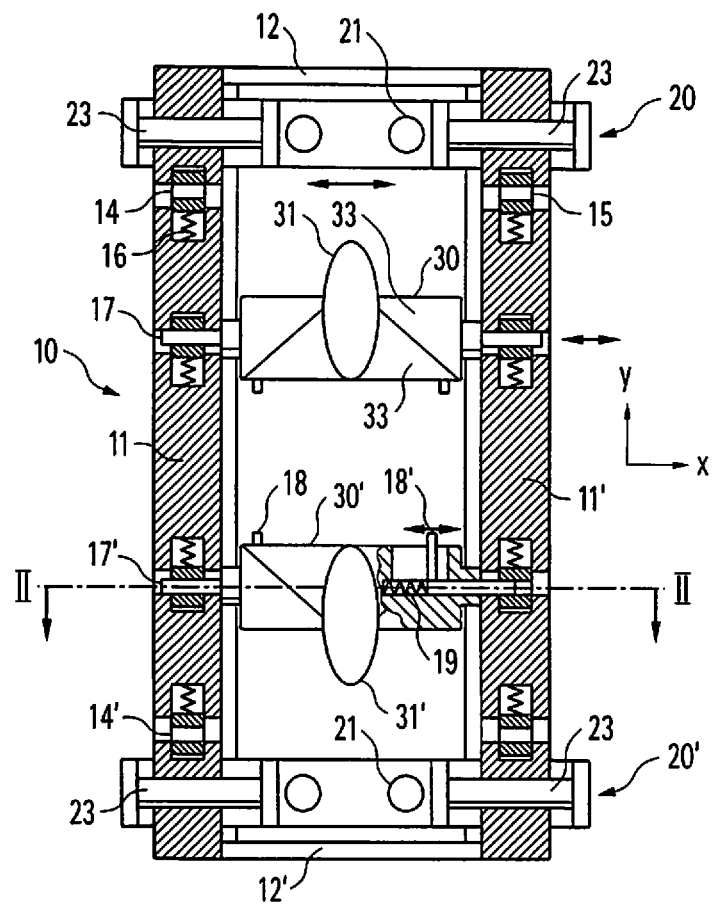
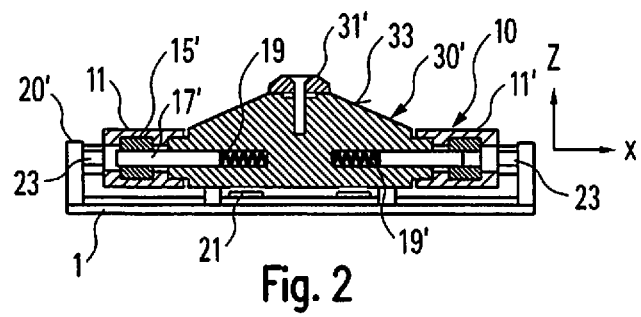
Fig. 1
Fig. 2

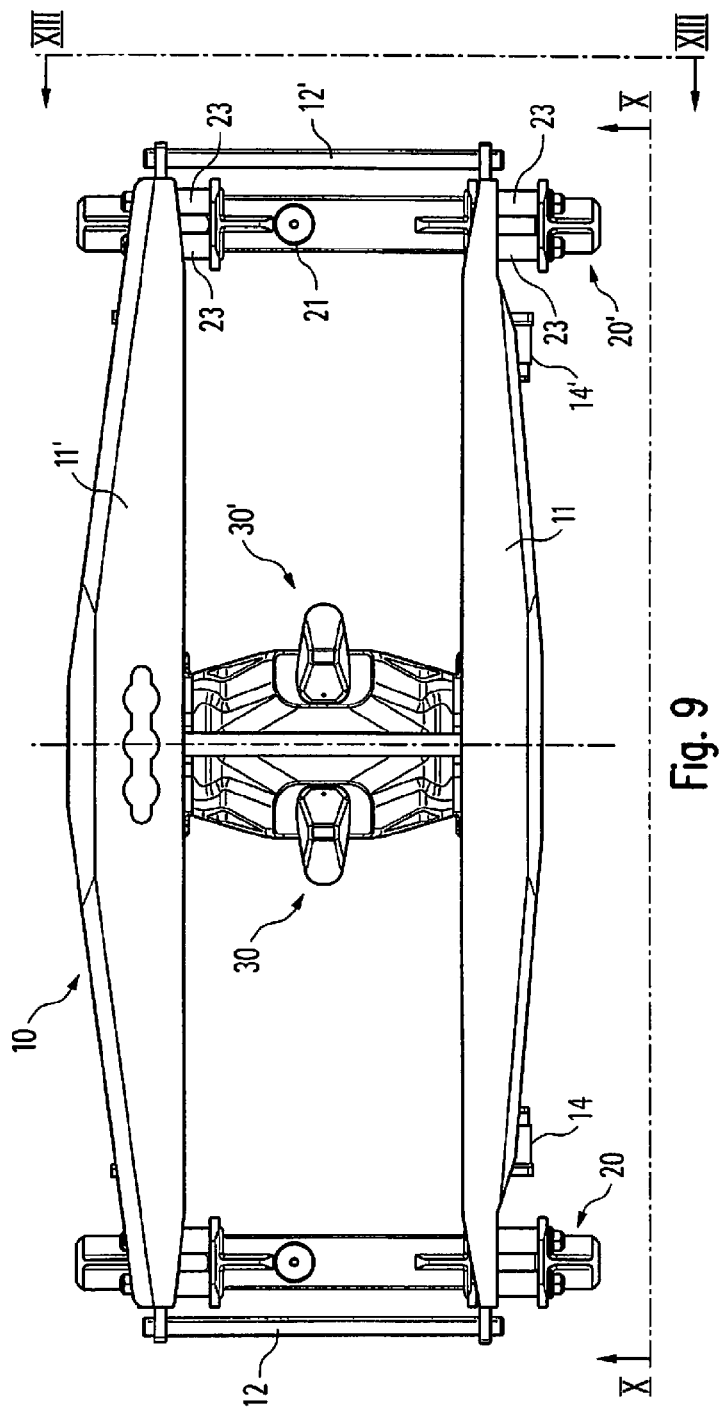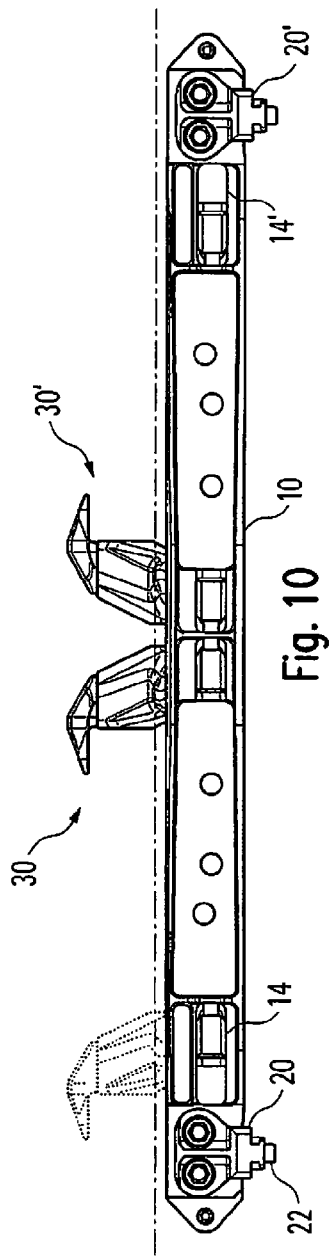
Fig. 9
Fig. 10

LOCKING ELEMENT

CROSS-REFERENCE TO RELATED APPLICATIONS

This application claims priority to, and is a National Phase application of, pending PCT/EP2009/004484 entitled, LOCKING ELEMENT, filed Jun. 22, 2009, the disclosure of which is hereby incorporated by reference in its entirety.

FIELD OF THE INVENTION

The invention concerns a locking element to secure containers or similar freight on a cargo bay floor of an aircraft, a cargo bay floor and the use of a locking element.

BACKGROUND OF THE INVENTION

Containers or similar freight to be secured on the cargo bay floor can be of different sizes. In particular there are various standard sizes for containers, e.g. 223.52 cm (88 inch) and 243.84 cm (96 inch). To secure the containers, locking elements with locks are used. The locks surround and hold a part section of the container. The distances between locks for holding containers must correspond to the size of the container concerned. If the spacing of the locks does not correspond to the size of the container, the container cannot be secured by the locks.

EP 0753 457 B1 describes a locking element of the type cited initially. The position of the lock in this locking element cannot be changed. Thus the lock spacing cannot be adapted to containers of different sizes.

SUMMARY OF THE INVENTION

Some embodiments provide a locking element with locks to secure containers in which the distances between locks can be adapted to different container sizes.

In some embodiments of the invention, at least one lock (preferably two) with claws for fixing the container can be moved and fixed in a guide of a frame of the locking element in the transverse direction of the aircraft (y; –y). Thus the position of the lock and hence the distance between locks to secure a container can be adapted to different container sizes. Preferably the lock has releasable fixing devices for fixing the lock to the guide in the frame so that the distance between locks of different locking elements can be modified easily and quickly.

In one embodiment the fixing devices comprise catch elements for securing the lock and counter-catch elements at defined positions in the frame. As a result the lock can be quickly released and fixed at the defined positions. Thus the lock can be adjusted quickly and easily to pre-specified distances from other locks or to container sizes, in particular standard sizes.

In a further embodiment the fixing device is formed sprung such that the lock can be moved against spring force in the transverse direction (y; –y). The spring force presses the lock against the container which the lock secures. If the distance between the locks and the secured container increases due to a deformation of the cargo bay floor (in particular in the wing region), the spring force moves the lock against the container and thus compensates for the deformation of the cargo bay floor. As a result it is ensured that even on deformation of the cargo bay floor, the lock will surround and hold a part section of the container. On a reduction in the distance between the lock and further locks to secure the container due to a deformation of the cargo bay floor, the lock is pressed by the secured container against the spring force and thus the deformation is compensated. As a result excessive loading on the lock, which can lead to a breakage of the lock or claw, is prevented.

The fixing device can comprise catch slides guided in the frame under spring loading as counter-catch elements. One of the advantages here is that the springing is located in the frame and thus the lock is lighter. Also the springing can more easily be replaced.

The lock can comprise a travel slide in which the claw is swivellably mounted and which can be moved and fixed in the guide. One advantage of this, inter alia, is that further parts e.g. load-holding devices which can be mounted in the travel slide are always moved together with the lock.

In one embodiment the lock comprises a swivel shaft about which the lock is held swivellable from a raised working position into a lowered loading position. As a result the lock can be lowered such that containers can pass over the locking element and the lock. Preferably the swivel shaft forms the part of the fixing device via which forces exerted during holding are transferred to the frame. In this embodiment the shear forces or torques acting on the frame, which occur due to forces acting on the lock, are reduced.

In a further embodiment the swivel shaft comprises journals which are mounted displaceable against a spring force to release the fixing devices. The advantage of this, inter alia, is that the fixing devices in the form of journals can easily be released by being retracted into the lock. A further advantage is that the journals engage at the defined positions under spring force.

The mounting devices can be connected with the frame mobile in the longitudinal direction (x), wherein preferably parts of the mounting devices are arranged in the region of and preferably centrally to the longitudinal ends of frame side rails running in the transverse direction (y). Due to the mobility, the position of the lock in the longitudinal direction (x) can be adapted to the position of the containers. By arranging parts of the mounting devices centrally to the longitudinal ends of frame side rails running in the transverse direction (y), a better force transfer is possible from the frame to the cargo bay floor.

In the locking element, load-holding devices can be provided such as rollers, ball rollers or follower rollers, wherein the load-holding devices are preferably arranged mobile in the frame. The load-holding devices facilitate movement of the container beyond the locking element in that they support a (part) load of the container and define the vertical position of the container relative to the lock. The mobility of the load-holding devices allows the load-holding devices to be arranged for example according to the position of the lock in the locking element. The load-holding devices can also be arranged removable so that if no load-holding devices are required, weight is saved.

Preferably the lock has chamfered surfaces for moving the lock from the working position into the loading position when containers pass over it. One advantage of this is that if a container is moved onto a locking element with a lock in the working position, or opposite the load insertion direction, the container presses on the chamfers of the lock and as a result the lock is moved out of the working position into the loading position. Thus containers can pass over the lock in or opposite the loading direction even if the lock is in the working position.

BRIEF DESCRIPTION OF THE DRAWINGS

The invention is explained in more detail with reference to drawings of embodiment examples. These show:

FIG. 1 a diagrammatic view of a locking element;

FIG. 2 a cross-section of the locking element along line II-II in FIG. 1;

FIG. 9 a top view of the locking element in FIG. 3;

FIG. 10 a side view of the locking element along line X-X in FIG. 9;

DETAILED DESCRIPTION

Figure 3:
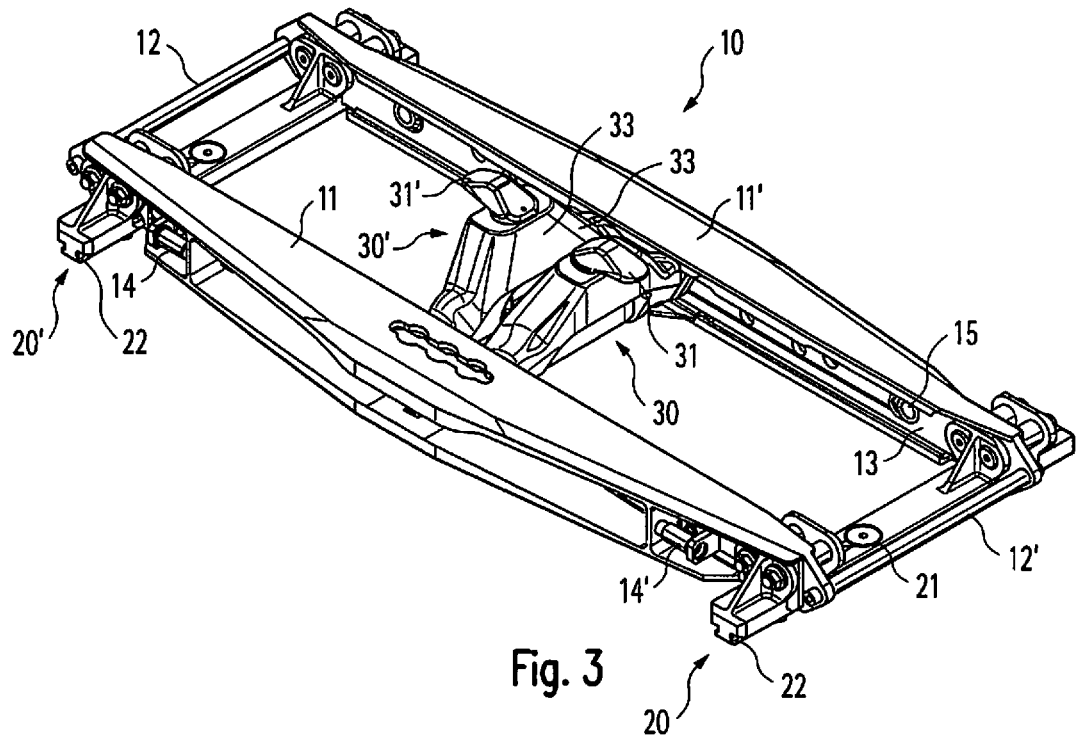
FIG. 3 a perspective view of a locking element with the locks in the working position.

In the description below, the same reference numerals are used for the same parts and those with similar effect.

FIG. 1 shows a locking element in a diagrammatic view. The locking element comprises a frame 10 which has mounting devices 20, 20' with which the frame 10 can be attached to a cargo bay floor 1 of an aircraft. The frame 10 comprises two side rails 11, 11' with cross members 12, 12' at the ends. On the frame 10 of the locking element are mounted two locks 30, 30' mobile in the longitudinal direction of the locking element which corresponds to the transverse direction of the aircraft (y; −y), each of which comprises a claw 31, 31'. In a working position of the two locks 30, 30', the claws 31, 31' for holding the container (not shown) point in two opposing directions along the longitudinal direction of the locking element. The locks 30, 30' are mobile in the longitudinal direction of the locking element in order to change quickly and easily the position of the locks 30, 30' and hence the distance between these locks 30, 30' and further locking elements not shown.

The locks 30, 30' comprise journals 17, 17' as catch elements which can engage in counter-catch elements 15 located at defined positions in the frame 10. The defined positions correspond to container standards so that the distances between the locks 30, 30' can quickly be adapted to standard container sizes. The locks 30, 30' each comprise two release levers 18, 18' which can be moved against the spring force of a fixing spring 19 in the direction of the middle of the lock 30, 30' in order to release the journals 17, 17' from the counter-catch elements 15. The journals 17, 17' can thus be retracted into the lock 30, 30'. The fixing springs 19 allow the journals 17, 17' to engage at defined positions. Thus the lock 30, 30' is fixed at the respective defined position.

The counter-catch elements 15 comprise spring-loaded catch slides 14, 14' which allow movement of the locks 30, 30' in the longitudinal direction of the locking element against the force of a spring 16. The spring 16 presses the lock 30, 30' against the container which the lock is securing. If deformation of the locking element increases the distance between the lock 30, 30' and the secured container, the spring 16 moves the lock 30, 30' against the container and thus compensates for the deformation of the cargo bay floor. This ensures that on deformation of the cargo bay floor, the lock 30, 30' can surround and hold a part section of a container. On a reduction of the distance between the locks 30, 30' and further locks to secure the container, due to deformation of the cargo bay floor, the locks 30, 30' are moved away from the secured container against the force of spring 16 and thus the deformation is compensated. Thus over-loading of the lock 30, 30', which could for example lead to a breakage of the lock 30, 30' or claw 31, 31', is prevented.

The embodiment of a locking element shown in FIG. 1 comprises two mounting devices 20, 20' at two opposing longitudinal ends, with which the frame 10 can be mounted to the cargo bay floor 1. The frame 10 is preferably attached by the mounting devices 20, 20' to rails on the cargo bay floor. The distance between the mounting devices 20, 20' of a locking element corresponds to the distance between two, in particular adjacent, rails on the cargo bay floor. Hook-like fixing parts 22 (see FIGS. 3 to 8; 13) of mounting device 20, 20' can be introduced into the rails. The locking element can now be moved in that the fixing parts 22 of the mounting device 20, 20' introduced into the rails are fixed in the rails in a height direction of the aircraft (z). Each of the mounting devices 20, 20' comprises at least one fixing element 21, 21' running in the height direction of the aircraft (z) with which the mounting device 20, 20' can be fixed to the rails, thus securing the mounting device 20, 20' in a rail direction which corresponds to the longitudinal direction of the aircraft (x).

In the embodiment shown here, the mounting devices 20, 20' are connected with the frame 10 mobile in the longitudinal direction of the aircraft (x) by means of guide rails 23, in order to adapt the position of the locks 30, 30' to the position of the container in the longitudinal direction of the aircraft (x). Preferably parts of the mounting devices 20, 20' are arranged below the longitudinal ends of side rails 11, 11' of frame 10 running in the transverse direction (y), so that an even load application to the cargo bay floor is guaranteed.

FIG. 2 shows a cross-section through the locking element of FIG. 1 along line II-II. It is clear how the journals 17, 17' of lock 30, 30' engage in the counter-catch elements 15 in the frame 10, which are here formed as catch slides 14, 14'. The swivel axis of the locks 30, 30' is preferably identical to the axis of the fixing devices with which the locks 30, 30' are fixed to the frame 10.

As a result forces occurring during holding can be transferred directly from the locks 30, 30' through the fixing device to the frame 10. Shear forces or torques acting on the frame 10, which could result from forces acting on the lock 30, 30', are thus reduced. The lock 30, 30' can swivel about the shaft, which runs from one journal 17, 17' to the other, from the working position shown here into a lowered loading position.

FIG. 3 shows a perspective view of a locking element. The two locks 30, 30' are fixed in a raised working position for securing containers at defined positions close to the middle of the locking element. The locks 30, 30' are arranged mobile and able to be fixed in a guide 13, 13'. The locks 30, 30' have chamfers 33 on three sides so that when a container passes over them, they can be swivelled into the lowered loading position.

Figure 4:
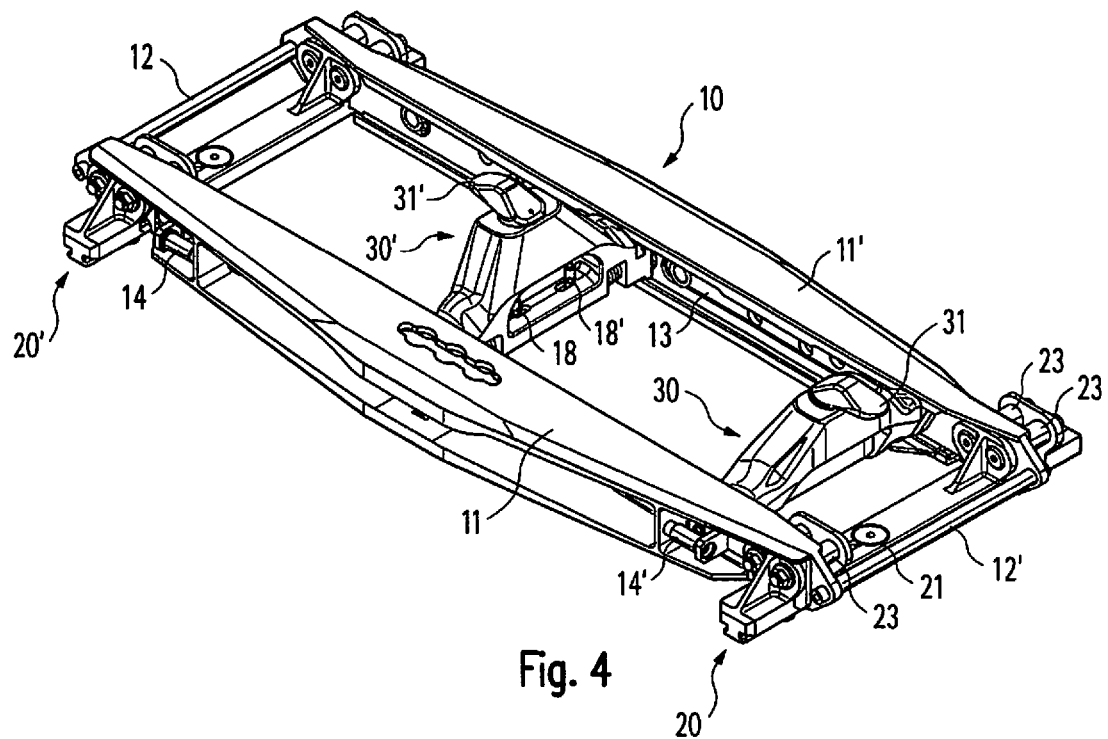
FIG. 4 a perspective view of the locking element according to FIG. 3 with one lock in a middle and one lock in an outer position.
Figure 5:
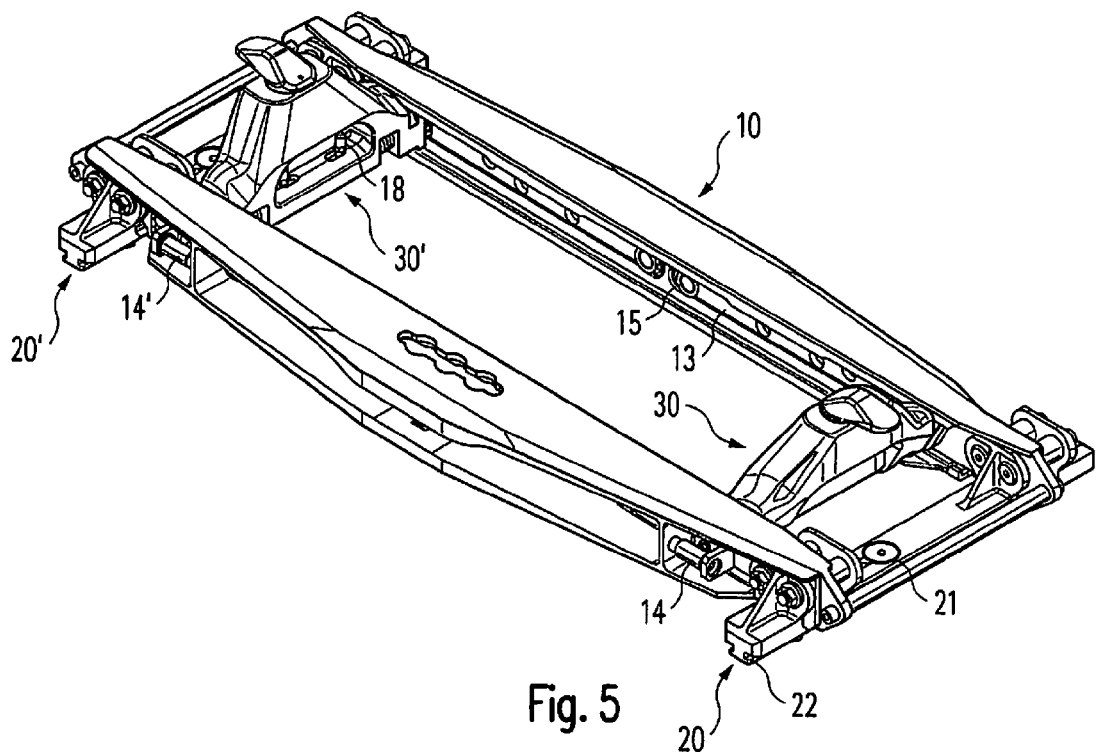
FIG. 5 a perspective view of the locking element in FIGS. 3 and 4 with both locks in an outer position.

FIG. 4 shows a perspective view of the locking element in FIG. 3 wherein one lock 30 is located near the middle of the locking element, while one lock 30' has been moved and fixed in guide 13, 13' close to one longitudinal end of the locking element. FIG. 5 shows the locking element in FIGS. 3 and 4 with both locks 30, 30' moved and fixed in guide 13, 13' each at one longitudinal end of the locking element.

Figure 6:
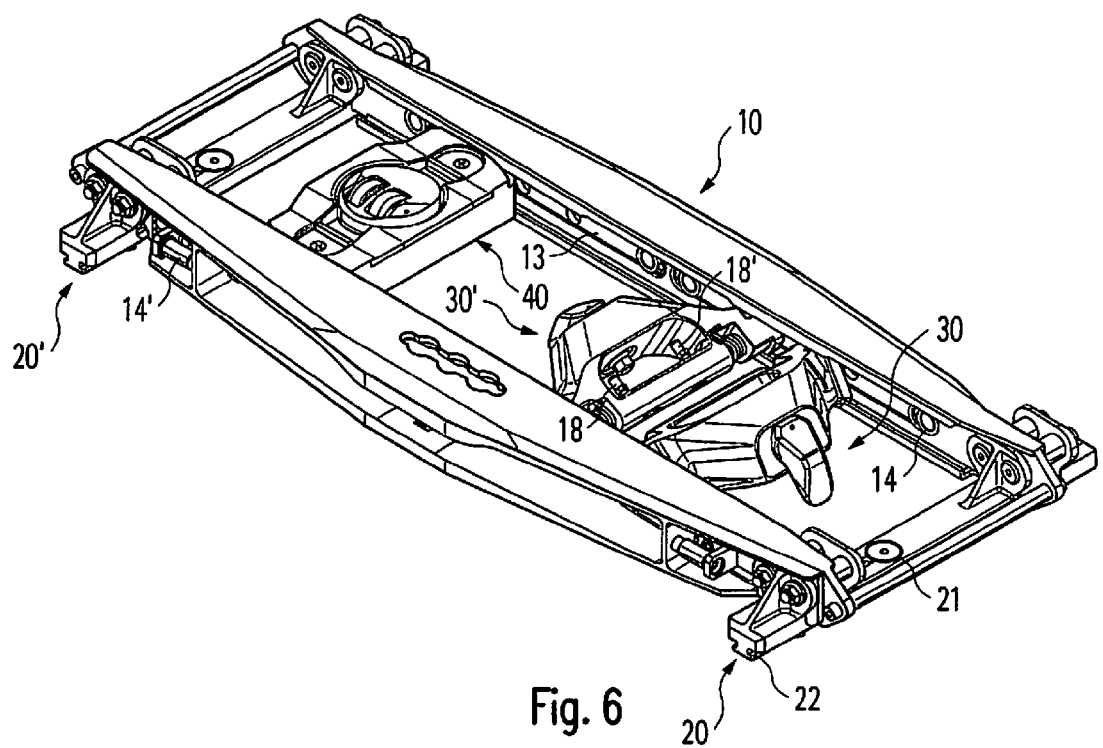
FIG. 6 a perspective view of the locking element in FIGS. 3 to 5 with both locks in the loading position.

FIG. 6 shows the locking element in FIGS. 3 to 5 wherein both locks 30, 30' are in the lowered loading position in which they do not protrude above the plane of the frame 10 so that containers can pass over the locking element and locks 30, 30'. The locking element furthermore comprises, as well as the two locks 30, 30', a load-holding device 40 in the form of a swivel castor which is inserted in guide 13, 13'. The load-holding devices 40 are arranged mobile in frame 10 and removable. They support the movement of the container beyond the locking element in that they support a (part) load of the container. The swivel castor has two rollers which are mounted in a rotatable plate. By rotation of the rollers parallel to the movement direction of the container, they facilitate the movement of the container in any arbitrary direction.

Figure 7:
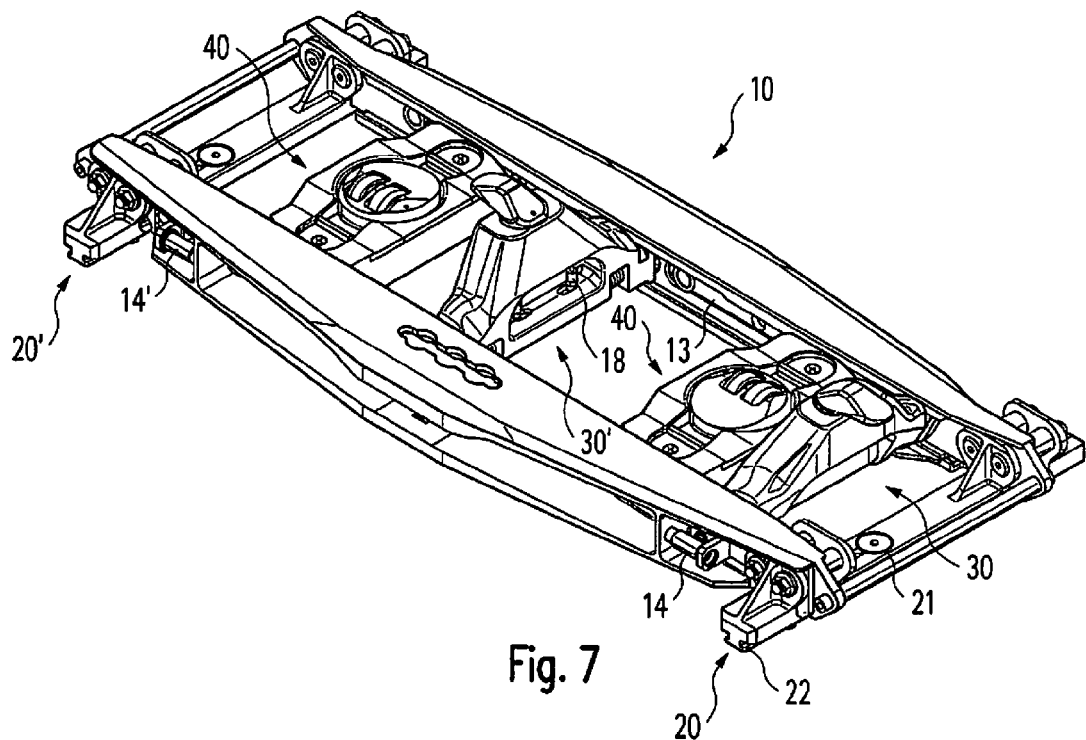
FIG. 7 a perspective view of the locking element in FIGS. 3 to 6 with two swivel castors as load-holding devices.

FIG. 7 shows the locking element in FIGS. 3 to 6 with two locks 30, 30' in the raised working position and two swivel castors mounted on frame 10.

Figure 8:
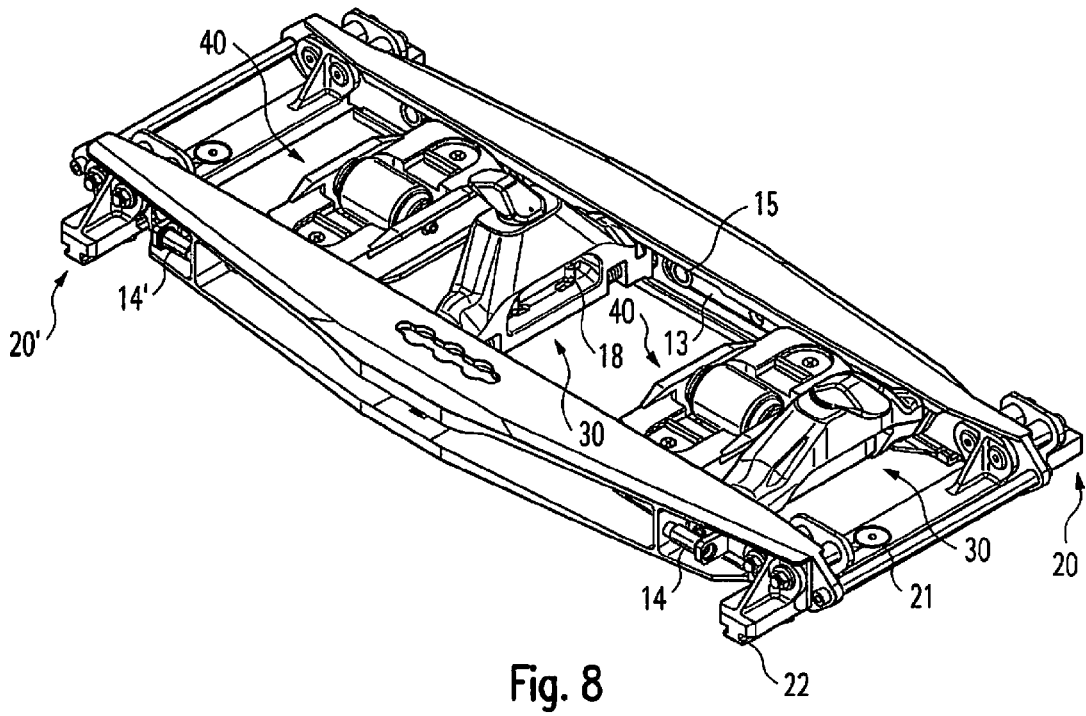
FIG. 8 a perspective view of the locking element in FIGS. 3 to 7 with two rollers as load-holding devices.

In FIG. 8 the locking element according to FIGS. 3 to 7 comprises two rollers as load-holding devices 40. The rollers support the movement of the containers parallel to the roller direction, which in FIG. 8 runs transverse to the longitudinal direction of the locking element, in that the rollers support a (part) load of the container. The load-holding devices 40 can also comprise ball rollers.

FIG. 9 shows a top view of the locking element in FIG. 3. The mounting devices 20, 20' are arranged around and below longitudinal ends of the two side rails 11, 11'. FIG. 10 shows a side view of the locking element in FIG. 9 along line X-X. Locks 30, 30' are both close to the middle of the locking element. Dotted lines in FIG. 9 indicate the position close to one longitudinal end of the locking element to which one lock 30 can be moved.

Figure 11:
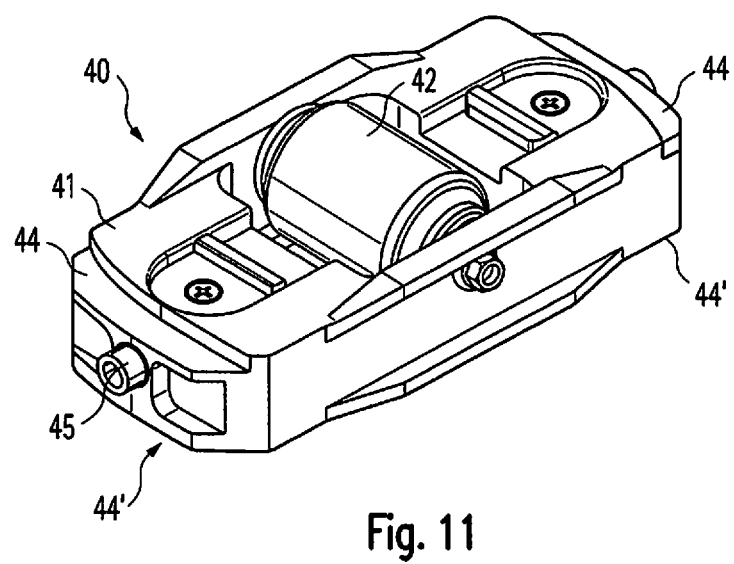
FIG. 11 a roller as a load-holding device.
Figure 12:
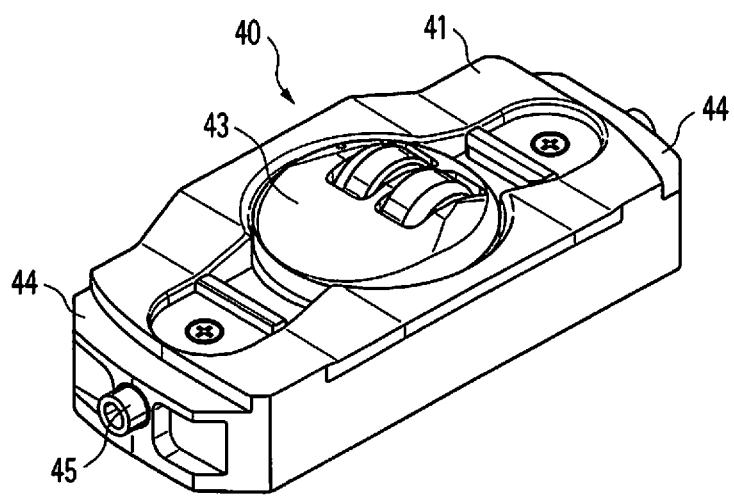
FIG. 12 a swivel castor as a load-holding device.

FIG. 11 and FIG. 12 show two embodiments of the load-holding devices 40 as rollers or swivel castors. Here holding frames 41 are provided in which a roller 42 or swivel castor 43 (following roller) is mounted. The holding frame 41 has guide faces 44, 44' at its end which can be inserted in the guides 13, 13' in the frame 10. For insertion the load-holding device is positioned at the correct height in the frame and then rotated about a vertical axis such that the guide faces 44, 44' slip into the guide 13, 13' of the frame 10. To fix it in this position, mobile retaining pegs 45 are used which engage in corresponding recesses in the frame 10.

Figure 13:
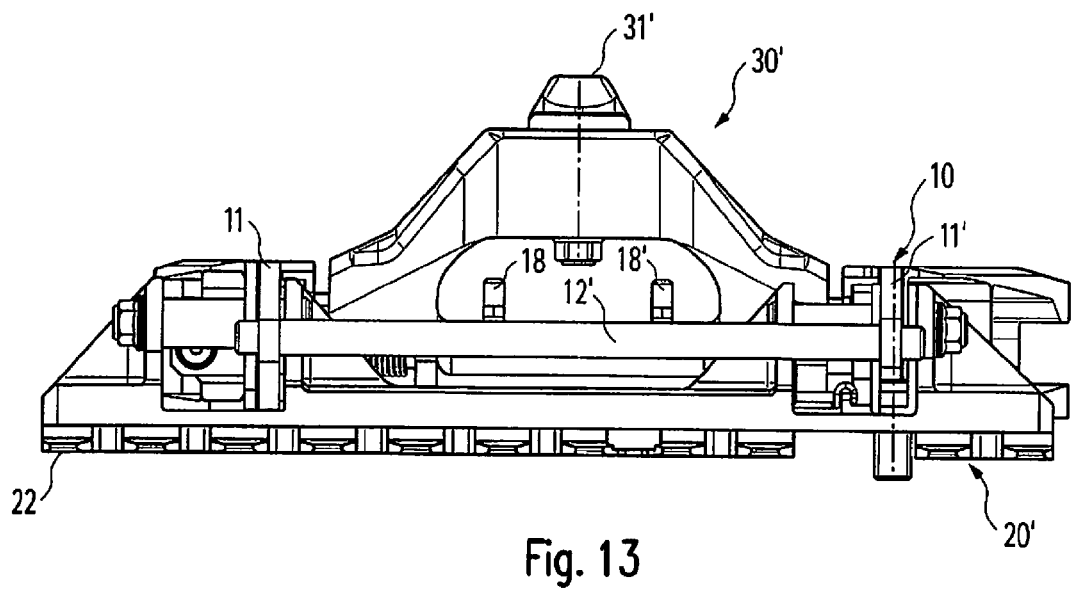
FIG. 13 a longitudinal view of the locking element along line XIII-XIII of FIG. 9.

FIG. 13 shows a side view of the locking element according to FIG. 9 along line XIII-XIII. The lock 30' with a claw 31' is in the working position in FIG. 13.

Figure 14:
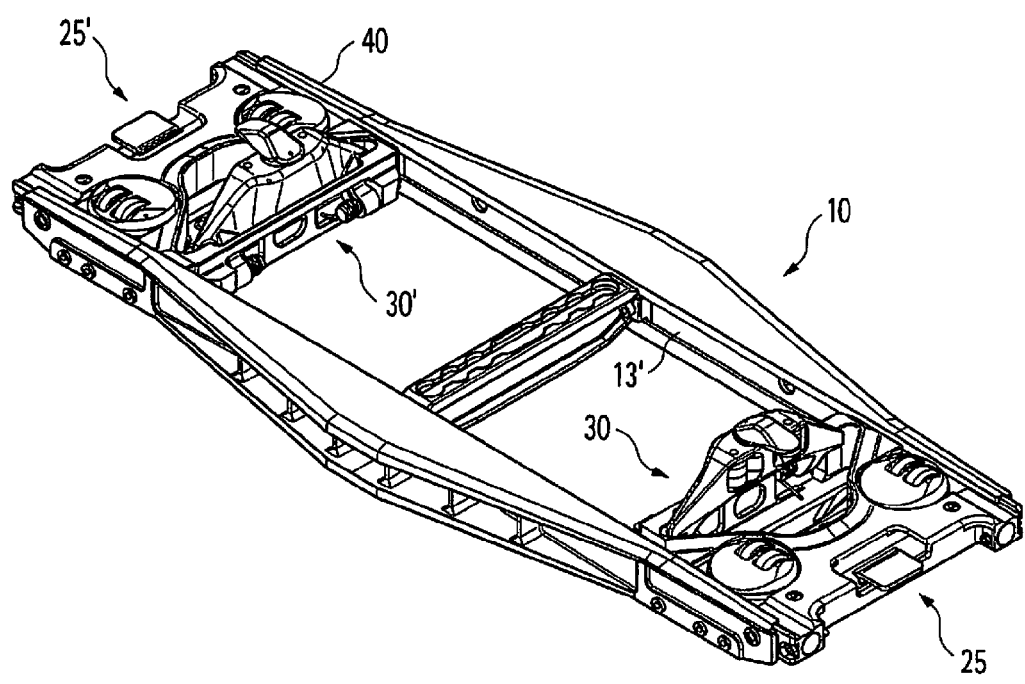
FIG. 14 a perspective view of a locking element with two travel slides.

FIG. 14 shows a locking element with two locks 30, 30' each of which comprise a travel slide 25, 25' and a claw 31, 31'. The claws 31, 31' are held swivellable in the travel slide 25, 25' so that they can be swivelled from the working position shown in FIG. 14 into the lowered loading position.

The travel slides 25, 25' are mobile in the guide 13' and can be fixed at defined positions. The claws 31, 31' are sprung-mounted in the slides 25, 25' such that the claws 31, 31' can be moved against a spring force inside the travel slide 25, 25' in the longitudinal direction of the locking element. The travel slide 25, 25' comprises further elements e.g. one or more load-holding devices 40.

The cargo bay floor of an aircraft can be configured for containers or similar freight of different sizes using the locking elements described. For this the locking elements are attached to the rails on the cargo bay floor. Now the distance between the locks can be adapted to different standard container sizes. This can be done by moving and fixing at least one lock 30, 30' along transverse direction (y; −y).

LIST OF REFERENCE NUMERALS

1 Cargo bay floor
10 Frame
11, 11' Side rail
12, 12' Cross member
13, 13' Guide
14, 14' Catch slide
15 Counter-catch element
16 Spring
17, 17' Journal
18, 18' Release lever
19, 19' Fixing spring
20, 20' Mounting devices
21, 21' Fixing element
22 Fixing part
23 Guide rail
25, 25' Travel slide
30, 30' Lock
31, 31' Claw
32 Chamfered surface
40 Load-holding devices
41 Holding frame
42 Roller
43 Swivel castor
44, 44' Guide faces
45 Retaining peg

The invention claimed is:

1. A locking element for securing containers or similar freight on a cargo bay floor of an aircraft in a vertical direction (z) perpendicular to the cargo bay floor and in a transverse direction (y) perpendicular to the longitudinal direction (x) of the aircraft, comprising:
   a frame including a guide extending along a longitudinal direction of the locking element,
   mounting devices for fixing the frame to the cargo bay floor, and
   at least one lock attached to the frame, the lock including a claw for securing containers or similar freight in the transverse direction (y; −y) to surround and hold a part section of the container, wherein the lock is selectively movable along the guide in a longitudinal direction of the locking element which corresponds to the transverse direction (y; −y), and a releasable fixing device for selectively fixing the lock to the guide and for allowing the lock to be selectively movable in the longitudinal direction along the guide with respect to the frame to a desired longitudinal position with respect to the frame,
   wherein the releasable fixing device comprises a swivel shaft with a swivel axis about which the lock is swivellable from a raised working position to a lowered loading position while the swivel axis remains in the same longitudinal position with respect to the frame.

2. The locking element according to claim 1, wherein the fixing device comprises catch elements for securing the lock and counter-catch elements at defined positions in the frame.

3. The locking element according to claim 1, wherein the fixing device is formed springily such that the lock can be moved against a spring force in the transverse direction (y; −y).

4. The locking element according to claim 3, wherein the fixing device comprises catch slides guided in the frame and spring-loaded as counter-catch elements.

5. The locking element according to claim 1, wherein the lock comprises a travel slide in which the claw is swivellably mounted and which can be moved and fixed in the guide.

6. The locking element according to claim 1, wherein the swivel shaft comprises a journal mounted displaceable against spring force to release the lock from the frame for movement along the guide.

7. The locking element according to claim 1, wherein the mounting devices are connected with the frame mobile in the longitudinal direction (x), wherein preferably parts of the mounting devices are arranged in the region of and preferably centrally to longitudinal ends of side rails of the frame running in the transverse direction (y; −y).

8. The locking element according to claim 1, wherein load-holding devices are provided.

9. The locking element according to claim 7, wherein the load-holding devices are arranged removably on the frame.

10. The locking element according to claim 1, wherein the lock on at least one side has chamfered surfaces to move the lock from the working position to the loading position when a container passes over the lock in a direction which is not the same as a holding direction of the lock.

11. A cargo bay floor of an aircraft wherein the cargo bay floor comprises: rails which are attached to the cargo bay floor in the longitudinal direction of the aircraft (x), and at least one locking element according to claim 1, which is attached to the rails.

12. The cargo bay floor according to claim 11, wherein the at least one locking element is attached between two adjacent rails.

13. A method of configuring a cargo bay of an aircraft for containers or similar freight of different sizes, comprising the following steps:
  mounting of rails in the cargo bay of the aircraft;
  fixing of at least one locking element according to claim 1 to the rails or cargo bay floor of the aircraft;
  adjusting the distance between two locks of two locking elements to standard sizes of containers or similar freight by moving and fixing at least one lock along the transverse direction (y).

14. The locking element of claim 1, wherein the swivel shaft forms the part of the fixing device via which forces occurring during holding are transferred to the frame.

15. A locking element for securing a container or similar freight on a cargo bay floor of an aircraft in a vertical direction (z) perpendicular to the cargo bay floor and in a transverse direction (y) perpendicular to the longitudinal direction (x) of the aircraft, the locking element comprising:

a frame adapted to be mounted to the cargo bay floor, the frame including an elongate guide extending longitudinally with respect to the frame,
  a first lock including a swivel shaft coupled to the frame, the swivel shaft of the first lock including a swivel axis about which the first lock is swivellable between a raised working position and a lowered loading position, the swivel shaft of first lock being selectively movable along the guide with respect to the frame to a desired position,
  a second lock including a swivel shaft coupled to the frame, the swivel shaft of the second lock including a swivel axis about which the second lock is swivellable between a raised working position and a lowered loading position, the swivel shaft of the second lock being selectively movable along the guide with respect to the frame to a desired position, wherein the first lock and the second lock are selectively movable along the guide independently of one another.

16. A cargo bay floor of an aircraft, the cargo bay floor including:
  a first rail and a second rail extending along a longitudinal direction (x) of the aircraft, and
  a locking element for securing containers or similar freight to the cargo bay floor, the locking element including a frame, a first mounting device for fixing the frame to the first rail, a second mounting device for fixing the frame to the second rail, a first lock and a second lock attached to the frame, the first lock and the second lock each including a claw for securing containers or similar freight in the transverse direction (y) of the aircraft to surround and hold a part section of the container, the first lock being movable independently of the second lock, wherein a guide is provided in the frame for moving the first lock along a longitudinal direction of the locking element which corresponds to the transverse direction (y) of the aircraft, the first lock including a releasable fixing device for selectively fixing the first lock to the guide and for allowing the first lock to be selectively movable along the guide with respect to the frame to a desired position with respect to the frame,
  wherein the releasable fixing device of the first lock comprises a swivel shaft with a swivel axis about which the first lock is swivellable from a raised working position to a lowered loading position, the second lock having a raised working position, the claw of the second lock facing in the opposite direction as the claw of the first lock when the first and second locks are in the raised working positions.

* * * * *